US010264447B2

(12) United States Patent
Al-Kabra et al.

(10) Patent No.: US 10,264,447 B2
(45) Date of Patent: Apr. 16, 2019

(54) COMMUNICATION RECORD PRIVACY PROTECTION VALIDATION

(71) Applicant: T-Mobile USA, Inc., Bellevue, WA (US)

(72) Inventors: Rami Al-Kabra, Bothell, WA (US); Noah Dahlstrom, Bellevue, WA (US); Prem Kumar Bodiga, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/682,356

(22) Filed: Aug. 21, 2017

(65) Prior Publication Data
US 2019/0058991 A1 Feb. 21, 2019

(51) Int. Cl.
H04W 12/02 (2009.01)
H04M 3/22 (2006.01)
(Continued)

(52) U.S. Cl.
CPC ........... *H04W 12/02* (2013.01); *H04L 9/0643* (2013.01); *H04M 3/2218* (2013.01);
(Continued)

(58) Field of Classification Search
CPC ..... H04W 12/02; H04W 12/06; H04W 12/08; H04L 9/0643; H04L 2209/80; H04M 3/2218
(Continued)

(56) References Cited

U.S. PATENT DOCUMENTS 5,706,330 A * 1/1998 Bufferd ................ H04M 17/02
379/114.01
8,639,221 B1 * 1/2014 Zang .................... H04W 12/02
455/411
(Continued)

FOREIGN PATENT DOCUMENTS

WO 2016045071 A1 3/2016

OTHER PUBLICATIONS

International Search Report and Written Opinion for PCT Application No. PCT/US2018/047383, dated Dec. 3, 2018, 10 pages.

*Primary Examiner* — William Nealon
(74) *Attorney, Agent, or Firm* — Han Santos, PLLC

(57) ABSTRACT

The implementation of anonymization validation protects the privacy of subscribers that uses the telecommunication services of a wireless telecommunication network. The anonymization validation checks the data in an anonymized communication record table to ensure the data is properly filtered or encrypted. The anonymized communication record table contains data pertaining to at least one of telephone calls, messages, and data connectivity sessions that are initiated or received by multiple subscribers of a wireless telecommunication network. The anonymized communication record is generated from an original communication record table via filtering out or encryption of the data pertaining to one or more subscribers. The performance of the anonymization validation includes performing opt-out filtering validation, network cell anonymity filtering validation, and telephone number encryption validation on the anonymized communication record table.

20 Claims, 7 Drawing Sheets

(51) Int. Cl.
  *H04L 9/06*    (2006.01)
  *H04W 12/06*   (2009.01)
  *H04W 12/08*   (2009.01)

(52) U.S. Cl.
  CPC ......... *H04L 2209/80* (2013.01); *H04W 12/06* (2013.01); *H04W 12/08* (2013.01)

(58) Field of Classification Search
  USPC ........................................................ 455/405
  See application file for complete search history.

(56) References Cited

U.S. PATENT DOCUMENTS

| | | | |
|---|---|---|---|
| 2003/0176182 A1* | 9/2003 | Cerami | G06Q 20/102 455/414.1 |
| 2004/0039809 A1* | 2/2004 | Ranous | H04L 29/06 709/223 |
| 2011/0246273 A1 | 10/2011 | Yarvis et al. | |
| 2012/0311657 A1 | 12/2012 | Boldyrev et al. | |
| 2014/0304825 A1 | 10/2014 | Gianniotis et al. | |
| 2016/0321456 A1 | 11/2016 | Schuman | |

* cited by examiner

COMMUNICATION RECORD PRIVACY PROTECTION VALIDATION

BACKGROUND

Mobile telecommunication carriers may at times share aggregated subscriber communication records of opted-in subscribers with third-party servicers in order to provide additional products or services to its subscribers. For example, the third-party servicers may analyze the aggregated subscriber communication records to identify mobile device usage trends of subscribers in different demographic groups, ascertain travel patterns of subscribers for municipal planners to manage traffic in a geographical area, identify products or services that are of potential interest to the subscribers, and/or so forth.

The aggregated subscriber communication records contain only the communication record information of subscribers that have consented, i.e., opted-in, to such sharing of aggregated data with the third-party servicers. Further, the aggregated subscriber communication records of such subscribers are carefully anonymized so that they do not contain information that can personally identify any one subscriber to the third-party servicers. The aggregated nature of the shared subscriber communication records, as combined with data anonymization, ensure that subscribers remain completely anonymous to the third-party servicers. As a result, the third-party servicers are unable to identify any one subscriber using the aggregate subscriber communication records. Accordingly, the privacy of subscribers are always protected in the shared subscriber communication records.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
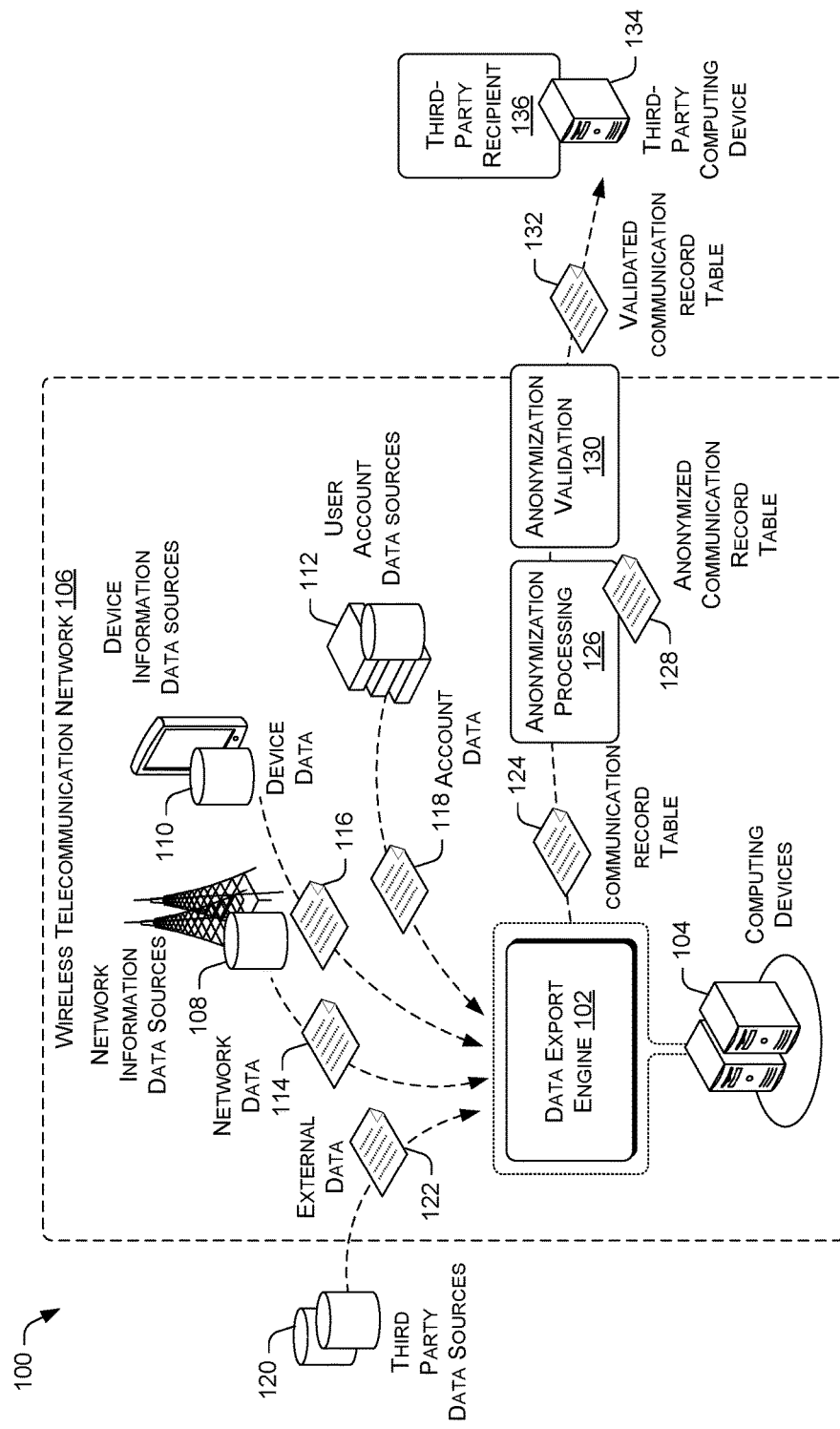
FIG. 1 illustrates an example architecture for implementing communication record privacy protection validation to ensure shared aggregated communication records do not reveal personally identifiable information of subscribers.

This disclosure is directed to techniques for performing communication record privacy protection validation on aggregated communication records. The implementation of the privacy protection validation ensures that aggregated communication records shared by a mobile telecommunication carrier with third-party servicers. Initially, a data export engine of the mobile telecommunication carrier may generate a communication record table using communication record data and subscriber data from multiple sources. In various embodiments, the communication record data may include information pertaining to calls, messages, and other data connectivity sessions that are initiated or received by subscribers. For example, the communication record data for a telephone call may include a time and date of the call, a duration of the call, an identifier of each network cell that is connected to during the call, a subscriber identifier associated with the telephone call, a device identifier of the device that is used to make or receive the telephone call, and/or so forth. The subscriber data may include the subscriber identifier, e.g., Mobile Station International Subscriber Directory Numbers (MSISDNs) of subscribers, whether each subscriber has opted-in or opted-out of participating in the sharing of aggregated communication records, and/or so forth.

Each of the communication record table that is generated by the data export engine may be tailored for a specific third-party servicer. For example, a communication record table may be generated that lists all subscribers that made phone calls that lasted for more than five seconds in a given geographical region. Following the generation of a communication record table, the data export engine may perform multiple data anonymization functions that includes opt-out filtering, network cell anonymity filtering, and telephone number encryption. The opt-out filtering removes all data belonging to subscribers who have opted out of sharing their communication record data from the communication record table. The network cell anonymity filtering removes data pertaining to subscriber communications that are handled by a particular network cell during a designated time period from the communication record table. Such filtering is performed when the number of unique subscribers that are handled by the particular network cell in the time period is less than a predetermined threshold number. The telephone number encryption encrypts any telephone numbers (e.g., MSISDNs) that are present in the communication record table. The execution of the data anonymization functions generates an anonymized communication record table.

Subsequently, the data export engine may perform anonymization validation on the anonymized communication record table. The anonymization validation may include opt-out filtering validation, network cell anonymity filtering validation, and telephone number encryption validation. Following successful anonymization validation of the anonymized communication record table, the data export engine may send the table as a validated communication record table to a computing device of a third-party servicer. However, if any particular validation of the anonymized communication record table fails, the data export engine may label the table as invalid, and alert an operator to perform error troubleshooting of the anonymization function that failed validation.

The implementation of anonymization validation ensures that all personally identifiable information of subscribers are removed from the aggregated subscriber communication records that are shared by a mobile telecommunication carrier with a third-party servicer. In this way, the privacy of the subscribers are protected while third-party servicers are allowed to analyze the data to provide services that may be of value to the subscribers and the public at large. Such anonymization validation may further reduce or eliminate the time and computing resources associated with transmitting and storing communication record tables that do not meet privacy requirements. The unnecessary recall and/or deletion of a stored communication record table from a data store due to a few isolated anonymization errors may also be reduced or eliminated. The techniques described herein may be implemented in a number of ways. Example implementations are provided below with reference to the following figures.

Example Architecture

FIG. 1 illustrates an example architecture 100 for deploying a workflow engine for troubleshooting user devices. The architecture 100 may include a data export engine 102. The data export engine 102 may execute on one or more computing devices 104. The computing devices 104 may include general purpose computers, such as desktop computers, tablet computers, laptop computers, servers, and so forth. However, in other embodiments, the computing devices 104 or components thereof may be virtual computing devices in the form of virtual machines or software containers that are hosted in a computing cloud. In further embodiments, the computing devices 104 may include smart phones, game consoles, or other electronic devices that are capable of receive inputs, process the inputs, and generate output data. In various embodiments, the computing devices 104 may be controlled by a mobile telecommunication carrier that provides the wireless telecommunication network 106, or controlled by a third-party entity that is working with the mobile telecommunication carrier.

The wireless telecommunication network 106 may provide a wide range of mobile communication services, as well as ancillary services and features, to subscribers and associated mobile device users. In various embodiments, the wireless telecommunication network 106 may provide wireless communication between multiple user devices. Further, the wireless telecommunication network 106 may also provide communications between the multiple user devices and user devices that are serviced by other telecommunications networks. In various embodiments, the user devices may include mobile handsets, smart phones, tablet computers, personal digital assistants (PDAs), smart watches, and/or electronic devices.

The wireless telecommunication network 106 may be implemented using multiple interconnected networks. In various embodiments, the wireless telecommunication network 106 may include multiple Radio Access Networks (RANs). The RANs may be connected to each other via regional ground networks. In turn, the regional ground networks may be connected to a core network by a wide area network (WAN). Each regional portion of the wireless telecommunication network 106 may include one or more RANs and a regional circuit and/or packet switched network and associated signaling network facilities. The wireless telecommunication network 106 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), 5th Generation (5G), and/or so forth. In some embodiments, the core network of the wireless telecommunication network 106 may accessed via wired or wireless local area networks (LANs). For example, a wireless local area network may be a network that is established using Wi-Fi or Bluetooth standards and hardware.

A RAN of the wireless telecommunication network 106 may include a number of base stations, also referred as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless telecommunication network 106. The core network may connect to a public packet data communication network, such as the Internet. Data and voice communications via the RANs, the core network, and the Internet may support a variety of services through the wireless telecommunication network 106.

In various embodiments, 2G and/or 3G network components of the wireless telecommunication network 106 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the wireless telecommunication network 106 may include an Evolved Packet Core (EPC) and an IP multimedia Subsystem (IMS) core.

The data export engine 102 may receive data from multiple data sources within the wireless telecommunication network 106, such as network information data sources 108, device information data sources 110, and user account data sources 112. These data sources may include network and database tools that monitor, generate, and/or store data related to the operation status and functionalities of the wireless telecommunication network 106. The network and database tools may be supervised by teams of personnel that support the operations of the wireless telecommunication network 106. The network information data sources 108 may provide network data 114 to the data export engine 102. In some embodiments, the network data 114 may include communication logs regarding the communication sessions of subscribers, in which the communication sessions may include telephone calls, messaging sessions, web browsing sessions, and/or other data connectivity sessions. For example, with respect to a telephone call, the communication logs may provide data such as a time and date of the call, a duration of the call, an identifier of each network cell that is connected to during the call, a subscriber identifier associated with the telephone call, a device identifier of the device that is used to make the telephone call, and/or so forth. With respect to a messaging session, the communication logs may provide data such as the time and date of message transmissions during the message session, the message size of each message, type of message (e.g., text message, Rich Communication Services (RCS) message, Multimedia Messaging Service (MMS) message, etc.), an identifier of each network cell that is connected to for each message, a subscriber identifier associated with the messages, a device identifier of the device that is used to send or receive messages, and/or so forth.

For a web browsing session or a data connectivity session, the communication logs may include data such as the time and date of the session, the duration of the session, the amount of data uploaded and/or downloaded during the session, an identifier of each network cell that is connected to for the session, a subscriber identifier associated with the session, a device identifier of the device that is used for the session. In some instances, the network data 114 may also include information regarding the technical and operational status of the wireless telecommunication network 106. For example, the network data 114 may indicate that Long-Term Evolution (LTE) spectrum coverage (or other spectrum coverage) is unavailable in a particular geographical area during a certain time or that a network cell was temporarily overwhelmed with network traffic at a particular time due to a major event.

The device information data sources 110 may provide the data export engine 102 with device data 116 regarding the user devices of subscribers. The device data 116 may indicate the brand, manufacturer, model, technical capabilities, feature settings, and operational statuses of user devices. For example, device data for a particular user device may indicate that Wi-Fi calling is enabled on the user device or that the user device is capable of using a specific communication band provided by the wireless telecommunication network 106. In other examples, the device data for the particular user device may indicate that Wi-Fi calling is disabled on the user device, a developer mode is active on the user device, a location tracking service is active on the user device, and/or so forth.

Furthermore, the data export engine 102 may obtain the account data 118 from the user account data sources 112. The user account data sources 112 may store the account details of multiple subscribers, such as account type (e.g., pre-paid or postpaid), billing preferences, service plan subscription, payment history, data consumed for each time period, minutes of talk time used for each time period, and/or so forth of each subscriber. For example, the account data of a particular subscriber may indicate that the subscriber has a postpaid account and that the subscriber is current with payments for the subscribed service plan. In various embodiments, the account data 118 may also contain information that indicates whether each subscriber has opted-in or opted-out of sharing their communication record data in an aggregated form with third-party servicers. The sharing of the data in aggregated form means that the data are not personally identifiable as belonging to specific subscribers, and that the data also cannot be deduced as belonging to specific subscribers. In some embodiments, subscribers may elect to opt-in or opt-out of the sharing of their communication record data by navigating to a web portal operated by the wireless telecommunication network 106 or an affiliate of the network via a web browser. In other embodiments, subscribers may use a selection menu accessible via applications on user devices to perform such elections, in which the opt-in or opt-out choices that are submitted via the application are eventually reported to the wireless telecommunication network 106. For example, the web portal or the selection menu may include a checkbox that the subscriber can select or de-select in order to opt-in or opt-out of such communication record data sharing.

In some instances, the data export engine 102 may further access data from one or more third-party data sources 120. Each third-party data source may be a database that is provided by a party other than the wireless telecommunication network 106. For example, a third-party database may be provided by a third-party vendor, a third-party contractor, a government entity, another telecommunication carrier, and/or so forth. Each third-party data source may contain additional external data 122, such as network-related information, device-related information, and/or user-related information, that supplement the information stored in the data sources 110-114. For example, a third-party database may include regulatory information for networks and devices, device manufacturer information, additional opt-in or opt-out of communication record data sharing by subscribers as collected via a third-party website, and/or so forth.

The data export engine 102 may generate a communication record table 124 based on the information acquired from the multiple data sources. In various embodiments, the communication record table 124 that is generated may be tailored according to the requirements of a third-party servicer. As such, a custom job script may be executed that causes the data export engine 102 to aggregate particular sets of data from the data sources into the communication record table 124. Additionally or currently, the data export engine 102 may also filter out certain sets of data from the communication record table 124.

Following the generation of the communication record table 124, the data export engine 102 may perform anonymization processing 126 on the communication record table 124. The anonymization processing 126 includes opt-out filtering, network cell anonymity filtering, and telephone number encryption. The opt-out filtering removes all data belonging to subscribers who have opted out of sharing their communication record data from the communication record table. The network cell anonymity filtering removes data pertaining to subscriber communications that are handled by one or more network cells in a geographical region during a designated time period from the communication record table, when the number of unique subscribers that are handled by each of the one or more network cells in the time period is less than a predetermined threshold number (e.g., 25 unique subscribers). The predetermined threshold number is designed to ensure there is sufficient noise in the communication records of subscribers that are associated with a network cell to protect subscriber privacy. For example, if a network cell only handled communications for user devices of 10 unique subscribers during a day when the threshold is 25 unique subscribers, then communication records pertaining to the communication services received by the user devices of these 10 unique subscribers are purged from the communication record table. In this way, the identities of the unique subscribers cannot be deduced by extrapolating subscriber behavior based on communication records of subscribers across multiple network cells. The telephone number encryption encrypts all telephone numbers (e.g., MSISDNs) that are present in the communication record table. The encryption is a one-way encryption that is not reversible, thereby guaranteeing that the telephone numbers are not decipherable from the encrypted data. Accordingly, the execution of the anonymization processing 126 generates an anonymized communication record table 128.

The data export engine 102 further performs anonymization validation 130 on the anonymized communication record table 128. The anonymization validation 130 may include opt-out filtering validation, network cell anonymity filtering validation, and telephone number encryption validation. The opt-out filtering validation is designed to verify that the anonymized communication record table 128 does not contain, i.e., is free from, communication record data that belong to subscribers who have opted out sharing their communication record data with third-party servicer. The network cell anonymity filtering validation is performed to ensure that when a network cell failed to service a sufficient number of unique subscribers during a time period, the communication record data of subscribers pertaining to the telecommunication service that the subscribers received from the network cell during the time period are purged from the anonymized communication record table 128. The telephone number encryption validation is performed to confirm that all telephone numbers in the anonymized communication record table 128 are encrypted via a one-way encryption, thereby guaranteeing that no telephone numbers of subscribers are revealed to the third-party servicer through the anonymized communication record table 128.

Following successful anonymization validation 130 of the anonymized communication record table 128, the data export engine 102 may send the anonymized communication record table 128 as a validated communication record table 132 to a computing device 134 of a third-party recipient 136. However, if any particular validation of the anonymized communication record table 128 fails, the data export engine 102 may label the anonymized communication record table 128 as invalid, and alert an operator to perform error troubleshooting of the specific portion of the anonymization processing 126 that failed validation.

Example Computing Device Components

Figure 2:
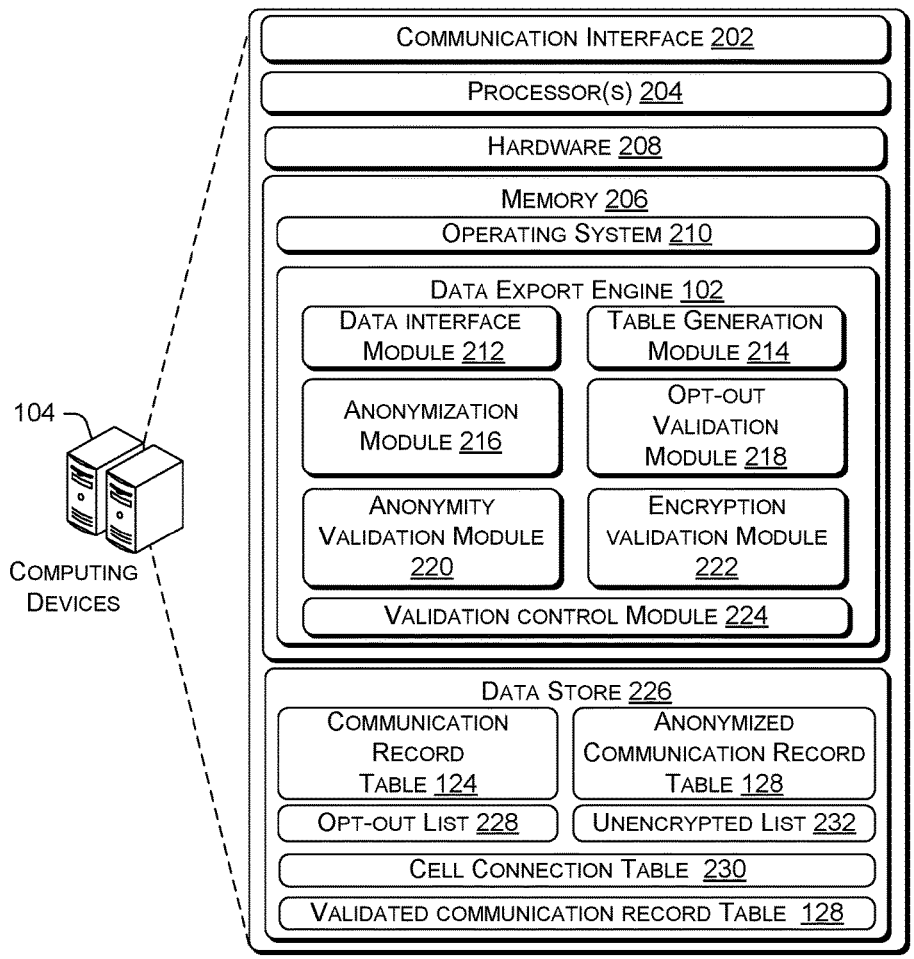
FIG. 2 is a block diagram showing various components of one or more illustrative computing devices that implement a data export engine that performs communication record privacy protection validation.

FIG. 2 is a block diagram showing various components of one or more illustrative computing devices that implement a data export engine that performs communication record privacy protection validation. The computing devices 104 may include a communication interface 202, one or more processors 204, memory 206, and hardware 208. The communication interface 202 may include wireless and/or wired communication components that enable the server to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing devices 104 may implement an operating system 210 and the data export engine 102. The operating system 210 may include components that enable the computing devices 104 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The data export engine 102 may include a data interface module 212, a table generation module 214, an anonymization module 216, an opt-out validation module 218, an anonymity validation module 220, an encryption validation module 222, and a validation control module 224. The modules may include routines, code segments, program instructions, objects, and/or data structures that perform particular tasks or implement particular abstract data types. The memory 206 may also include a data store 226 that is used by the data export engine 102.

The data interface module 212 may retrieve data from various data sources, such as the network information data sources 108, the device information data sources 110, the user account data sources 112, and the third-party data sources 120, for generating the validated communication record table 132. In various embodiments, the data interface module 212 may use data adaptors to retrieve data from the databases of the data sources. For example, the data interface module 212 may use data-agnostic data adaptors to access unstructured databases, and/or database-specific data adaptors to access structured databases. In some embodiments, the data interface module 212 may use a workflow scheduler to periodically check for and retrieve newly available data from the multiple data sources. The operations of the workflow scheduler may be dictated by configurable policies. For example, a configurable policy may specify the source data location, frequency of data retrieval, handling procedures for late arrival data, data retention period, and data disposal following an expiration of the data retention period. In some instances, adaptor-specific logic may be implemented to decode and/or convert the format of the data received from the various data sources for further processing. In alternative embodiments, the data interface module 212 may be directed manually by an authorized user via a user interface to retrieve data from the various data sources.

The data interface module 212 may further deliver validated communication records tables to the computing devices of third party recipients via a network. The network may include the wireless telecommunication network 106, a local area network (LAN), a larger network such as a wide area network (WAN), or a collection of networks, such as the Internet. In various embodiments, the data interface module 212 may call an application program interface (API) provided by the computing device 134 of the third-party recipient 136 to transfer the validated communication record table 132 to the computing device. The data interface module 212 may use protocols such as Hypertext Transfer Protocol (HTTP), File Transfer Protocol (FTP), etc., to deliver data to an application on a third-party computing device. Alternatively, the data interface module 212 may use scripting languages such as JavaScript, XML, etc., to pass data to the application on a third-party computing device.

The table generation module 214 may generate communication record tables from data received by the data interface module 212. The generation of a communication record table, such as the communication record table 124, may involve the performance of data aggregation and/or data filtering. The data aggregation may merge subscriber data from multiple source data tables using key identifier information of the subscribers commonly present in the source data tables. The data filtering may be performed to remove unwanted or undesired data from the source data tables or the generated communication record table 124. The communication record tables that are generated by the table generation module 214 may be tailored for different third-party servicers. Accordingly, the selection of data sources, the performance data aggregation, and/or the performance of data filtering may be directed by different job scripts. In some embodiments, the job scripts may be written in a declarative language, such as a structured query language (SQL)-type language. The table generation module 214 may translate a job script into task execution code, and then executing the code to generate a corresponding communication record table. Accordingly, each of the communication record tables as generated by the table generation module 214 may cover a specific geographical region for a particular time period.

The anonymization module 216 may perform anonymization processing 126, which includes opt-out filtering, network cell anonymity filtering, and telephone number encryption. The opt-out filtering removes all data belonging to subscribers who have opted out of sharing their communication record data from the communication record table. The anonymization module 216 may perform the opt-out filtering based on an opt-out list 228 that is produced from the account data 118. In other words, the opt-out list 228 may be generated on a periodic basis (e.g., hourly, daily, etc.) from subscriber opt-out submissions received via web portals or user device applications.

The network cell anonymity filtering removes data pertaining to subscriber communications that are handled by one or more network cells in a geographical region during a designated time period from the communication record table when the number of unique subscribers that are handled by each of the one or more network cells in the time period is less than a predetermined threshold number (e.g., 25 unique subscribers). The telephone number encryption encrypts all telephone numbers (e.g., MSISDNs) that are present in the communication record table. In various embodiments, the encryption may be performed using a one-way hash function, such as Message Digest 5 (MD5) hashing, Secure Hash Algorithm 256 (SHA256) hashing, SipHash, and/or so forth. Accordingly, the anonymization module 216 may generate an anonymized communication record table 128 from the communication record table 124.

The opt-out validation module 218 may perform opt-out filtering validation by comparing the anonymized communication record table 128 to the opt-out list 228. In various embodiments, the opt-out validation module 218 may execute a job script to join the anonymized communication record table 128 with the opt-out list 228. If the join operation does not return a match between the subscriber identifiers in the anonymized communication record table 128 with the subscriber identifiers in the opt-out list 228, the opt-out validation module 218 may determine that the opt-out filtering of the anonymized communication record table 128 is validated. For example, the subscriber identifier may be a subscriber name, a subscriber access identifier, or a subscriber login. The subscriber access identifier may be an identifier that is assigned by the wireless telecommunication network 106 to identify a user as a subscriber of the wireless telecommunication network 106. The subscriber access identifier is used by the wireless telecommunication network 106 is to authenticate the user via a built-in authentication mechanism for the purpose of providing the user with access to services and/or applications that are hosted by the wireless telecommunication network 106, as well as hosted by third-party service and/or application providers.

However, if one or more matching subscriber identifiers are found, the opt-out validation module 218 may determine that the opt-out filtering of the anonymized version is incomplete. Accordingly, the opt-out validation module 218 may generate an alert. The alert may include a request for an operations team of the wireless telecommunication network 106 to troubleshoot the cause of the error.

The anonymity validation module 220 may perform network cell anonymity filtering validation. For the validation of the anonymized communication record table 128, the anonymity validation module 220 may generate a cell connection table 230 from network data 114. The cell connection table may list the cell identifiers belonging to network cells of the wireless telecommunication network 106 in a geographical region that serviced less than a predetermined threshold number of unique subscribers in a designated time period. The geographical region and the time period covered by the cell connection table 230 coincides with the geographical region and the time period covered by the anonymized communication record table 128. Thus, the anonymity validation module 220 may compare the network cell identifiers present in the anonymized communication record table 128 to the network cell identifiers listed in the cell connection table 230. If the comparison does not return a match between the network cell identifiers in the anonymized communication record table 128 and the cell connection table 230, the anonymity validation module 220 may determine that the opt-out filtering of the anonymized communication record table 128 is validated. However, if one or more matching network cell identifiers are found, the anonymity validation module 220 may determine that the opt-out filtering of the anonymized version is incomplete. Accordingly, the anonymity validation module 220 may generate an alert. The alert may include a request for an operations team of the wireless telecommunication network 106 to troubleshoot the cause of the error.

The encryption validation module 222 may validate the encryption of the telephone numbers in the anonymized communication record table 128. Initially, the encryption validation module 222 may generate an unencrypted list 232 that contains the same unencrypted telephone numbers as the communication record table 124. The encryption validation module 222 may compare the unencrypted list 232 to the anonymized communication record table 128. For example, the comparison may be performed by joining the unencrypted list 232 to the anonymized communication record table 128 to determine whether there are value matches. If the comparison does not return a match between the unencrypted telephone numbers in the encrypted list 232 and the data in the anonymized communication record table 128, the encryption validation module 222 may determine that the encryption of the telephone numbers in the anonymized communication record table 128 is validated. However, if one or more matching unencrypted telephone numbers are found, the anonymity validation module 220 may determine that the encryption of the telephone numbers is incomplete. Accordingly, the anonymity validation module 220 may generate an alert. The alert may include a request for an operations team of the wireless telecommunication network 106 to troubleshoot the cause of the error.

The validation control module 224 may receive validation notifications from the opt-out validation module 218, the anonymity validation module 220, and the encryption validation module 222. Upon receiving notifications that the opt-out filtering, the network cell anonymity filtering, and the telephone number encryption have been validated, the validation control module 224 may determine that the anonymized communication record table 128 has been validated. Subsequently, the anonymized communication record table 128 is stored by the validation control module 224 as the validated communication record table 132 in the data store 226. The validation control module 224 may command the data interface module 212 to distribute the validated communication record table 132 to a third-party computing device of a third-party recipient. In various embodiments, a job script and/or associated metadata for the generation of a particular communication record table may also specify a destination (e.g., a network file directory, a network address, etc.) that is to receive the particular communication record table.

The data store 226 may store information that are used or processed by the data export engine 102. The data store 226 may include one or more databases, such as relational databases, object databases, object-relational databases, and/or key-value databases. The information may include the communication record table 124, the anonymized communication record table 128, the opt-out list 228, the unencrypted list 232, the cell connection table 230, and/or the validated communication record table 132. Additional details regarding the functionalities of the data export engine 102 are discussed in the context of FIGS. 3-7. Thus, the data export engine 102 may include other modules that perform the functionalities described in the context of these figures.

Example Processes

FIGS. 3-7 present illustrative processes 300-700 for implementing communication record privacy protection validation to ensure shared aggregated communication records do not reveal personally identifiable information of subscribers. Each of the processes 300-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-700 are described with reference to the architecture 100 of FIG. 1.

Figure 3:
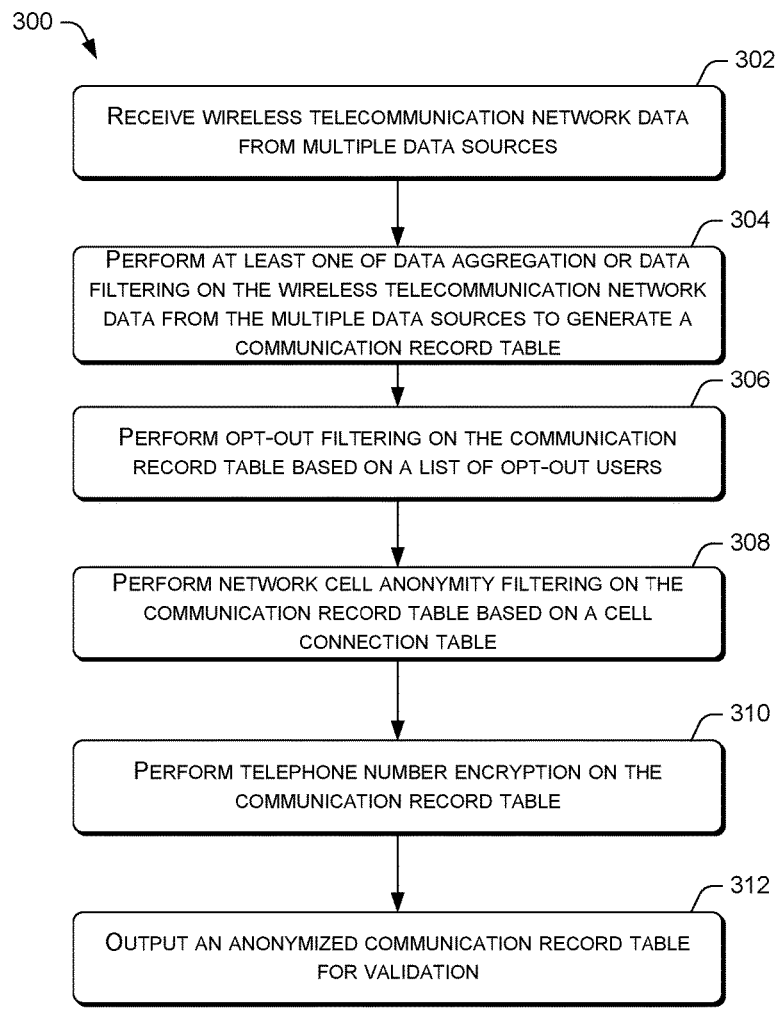
FIG. 3 is a flow diagram of an example process for generating an anonymized communication record table that undergoes communication record privacy protection validation.

FIG. 3 is a flow diagram of an example process 300 for generating an anonymized communication record table that undergoes communication record privacy protection validation. At block 302, the data export engine 102 may receive wireless telecommunication network data from multiple data sources. The multiple data sources may include network information data sources 108 that provides network data 114, device information data sources 110 that provides device data 116, and user account data sources 112 that provides account data 118. Additionally, the multiple data sources may include third-party data sources 120 that provide external data 122.

At block 304, the data export engine 102 may perform at least one of data aggregation or data filtering on the wireless telecommunication network data from the multiple data sources to generate a communication record table 124. In various embodiments, the data aggregation may merge subscriber data from multiple source data tables using key identifier information of the subscribers commonly present in the source data tables. The data filtering may be performed to remove unwanted or undesired data from the source data tables or the generated communication record table 124. The generated communication record table 124 may include information pertaining to calls, messages, and other data connectivity sessions that are initiated or received by subscribers.

At block 306, the data export engine 102 may perform opt-out filtering on the communication record table 124 based on a list of opt-out users, such as the opt-out list 228. The opt-out filtering removes all data belonging to subscribers who have opted out of sharing their communication record data from the communication record table. In various embodiments, the list of opt-out users may be generated on a periodic basis (e.g., hourly, daily, etc.) from subscriber opt-out submissions received via web portals or user device applications.

At block 308, the data export engine 102 may perform network cell anonymity filtering on the communication record table 124 based on a cell connection table, such as the cell connection table 230. The cell connection table may list one or more network cells of the wireless telecommunication network 106 in a geographical region that serviced less than the predetermined threshold number of unique subscribers in a designated time period. The network cell anonymity filtering removes data pertaining to subscriber communications that are handled by one or more network cells during a designated time period from the communication record table when the number of unique subscribers that are handled by the one or more network cells in the time period is less than a predetermined threshold number. The geographical region and the time period covered by the cell connection table coincides with the geographical region and the time period covered by the communication record table 124.

At block 310, the data export engine 102 may perform telephone number encryption on the communication record table. The telephone number encryption encrypts all telephone numbers (e.g., MSISDNs) that are present in the communication record table. The encryption is a one-way encryption that is not reversible, thereby guaranteeing that the telephone numbers are not decipherable from the encrypted data. At block 312, the data export engine 102 may output an anonymized version of the communication record table 124, such as the anonymized communication record table 128.

Figure 4:
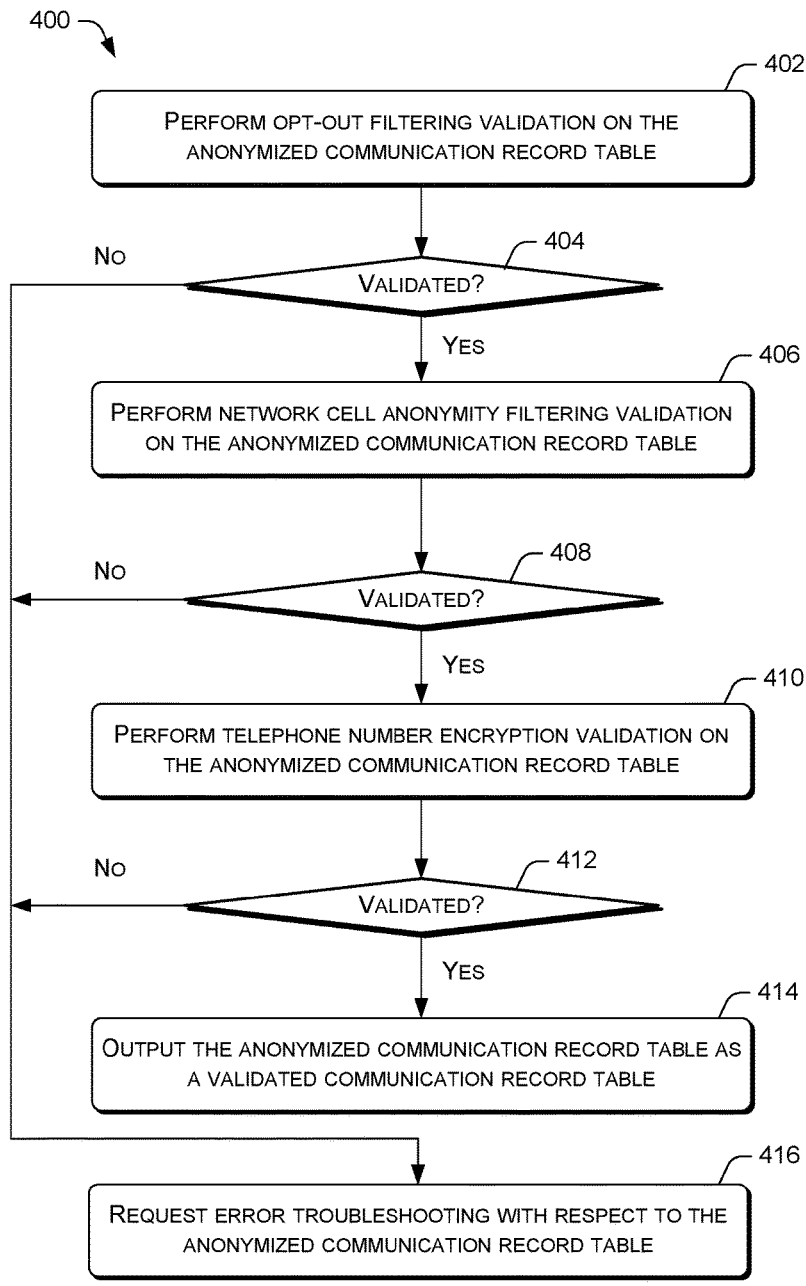
FIG. 4 is a flow diagram of an example process for performing communication record privacy protection validation on an anonymized communication record table.

FIG. 4 is a flow diagram of an example process 400 for performing communication record privacy protection validation on an anonymized communication record table. At block 402, the data export engine 102 may perform opt-out filtering validation on the anonymized communication record table 128. The opt-out filtering validation is designed to verify that the anonymized communication record table 128 does not contain communication record data that belong to subscribers who have opted out sharing their communication record data with third-party servicers. At decision block 404, if the data export engine 102 determines that the anonymized communication record table 128 is validated as not containing such communication record data ("yes" at decision block 404), the process 400 may proceed to block 406.

At block 406, the data export engine 102 may perform network cell anonymity filtering validation on the anonymized communication record table 128. The network cell anonymity filtering validation is performed to ensure that when one or more network cells in a geographical region failed to service a sufficient number of unique subscribers during a time period, the communication record data of subscribers pertaining to the telecommunication service that the subscribers received from each of the one or more network cells during the time period are purged from the anonymized communication record table 128. At decision block 408, if the data export engine 102 determines that such communication record data of subscribers are properly purged from the anonymized communication record table 128 ("yes" at decision block 408), the process 400 may proceed to block 410.

At block 410, the data export engine 102 may perform telephone number encryption validation on the anonymized communication record table. The telephone number encryption validation is performed to confirm that all telephone numbers in the anonymized communication record table 128 are encrypted via a one-way encryption, thereby guaranteeing that no telephone numbers of subscribers are revealed to the third-party servicer through the anonymized communication record table 128. At decision block 412, if the data export engine 102 validates that the anonymized communication record table 128 contains no unencrypted telephones ("yes" at decision block 412), the process 400 may proceed to block 414. At block 414, the data export engine 102 may output the anonymized communication record table 128 as the validated communication record table 132.

Returning to decision block 404, if the data export engine 102 determines that the opt-out filtering validation failed ("no" at decision block 404), the process 400 may proceed directly to block 416. At block 416, the data export engine 102 may request error troubleshooting with respect to the anonymized communication record table 128. For example, the data export engine 102 may generate an alert that includes a request for an operations team of the wireless telecommunication network 106 to troubleshoot the cause of the error. Returning to decision block 408, if the data export engine 102 determines that the network cell anonymity filtering validation failed ("no" at decision block 408), the process 400 may also proceed directly to block 416. Returning to decision block 412, if the data export engine 102 determines that the telephone number encryption validation failed ("no" at decision block 412), the process 400 may also proceed directly to block 416.

Figure 5:
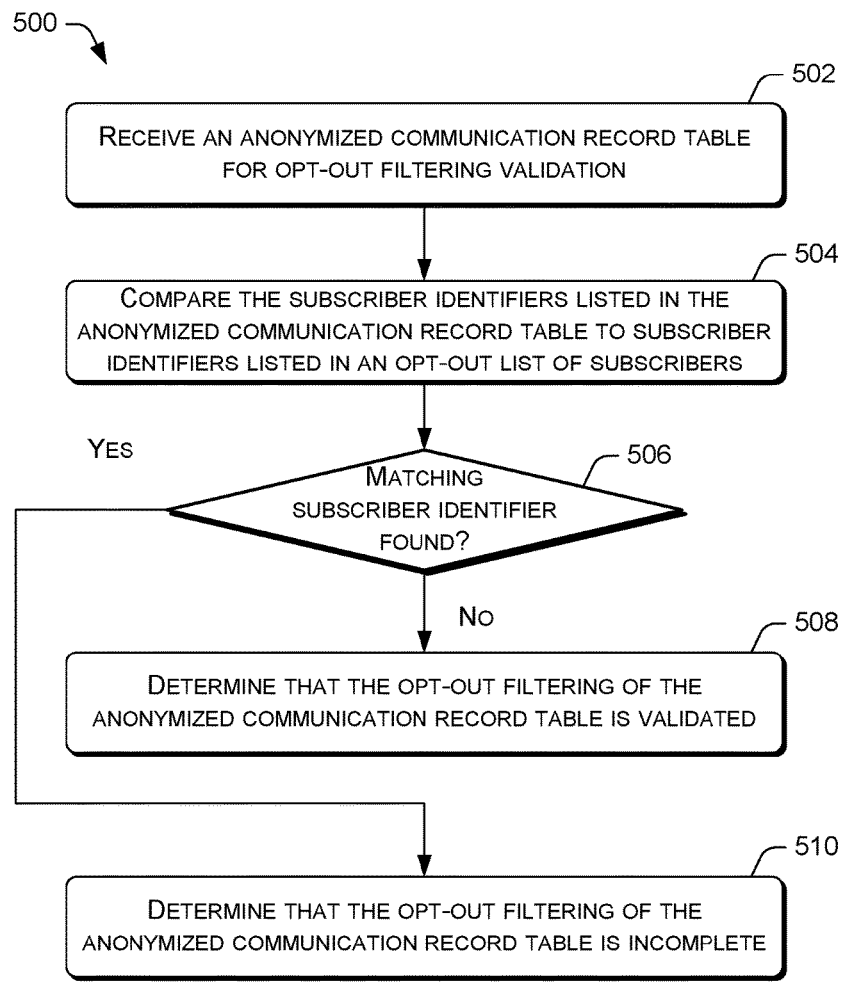
FIG. 5 is a flow diagram of an example process for performing opt-out filtering validation on an anonymized communication record table.

FIG. 5 is a flow diagram of an example process 500 for performing opt-out filtering validation on an anonymized communication record table. The example process 500 further describes block 402 of the example process 400. At block 502, the opt-out validation module 218 of the data export engine 102 may receive the anonymized communication record table 128 for opt-out filtering validation. The anonymized communication record table 128 may be generated by the anonymization module 216 of the data export engine 102 from the communication record table 124.

At block 504, the opt-out validation module 218 may compare the subscriber identifiers listed in the anonymized communication record table 128 to the subscriber identifiers in the opt-out list of subscribers, such as the opt-out list 228. In various embodiments, the opt-out validation module 218 may execute a job script to join the anonymized communication record table 128 with the opt-out list 228. At decision block 506, the opt-out validation module 218 may determine whether a matching subscriber identifier is found between the anonymized communication record table 128 and the opt-out list 228. Accordingly, if the comparison does not return a matching subscriber identifier between the anonymized communication record table 128 and the opt-out list 228 ("no" at decision block 506), the process 500 may proceed to block 508. At block 508, the opt-out validation module 218 may determine that the opt-out filtering of the anonymized communication record table 128 is validated.

However, if the comparison does return one or more matching subscriber identifiers between the anonymized communication record table 128 and the opt-out list 228 ("yes" at decision block 506), the process 500 may proceed to block 510. At block 510, the opt-out validation module 218 may determine that the opt-out filtering of the anonymized communication record table 128 is incomplete.

Figure 6:
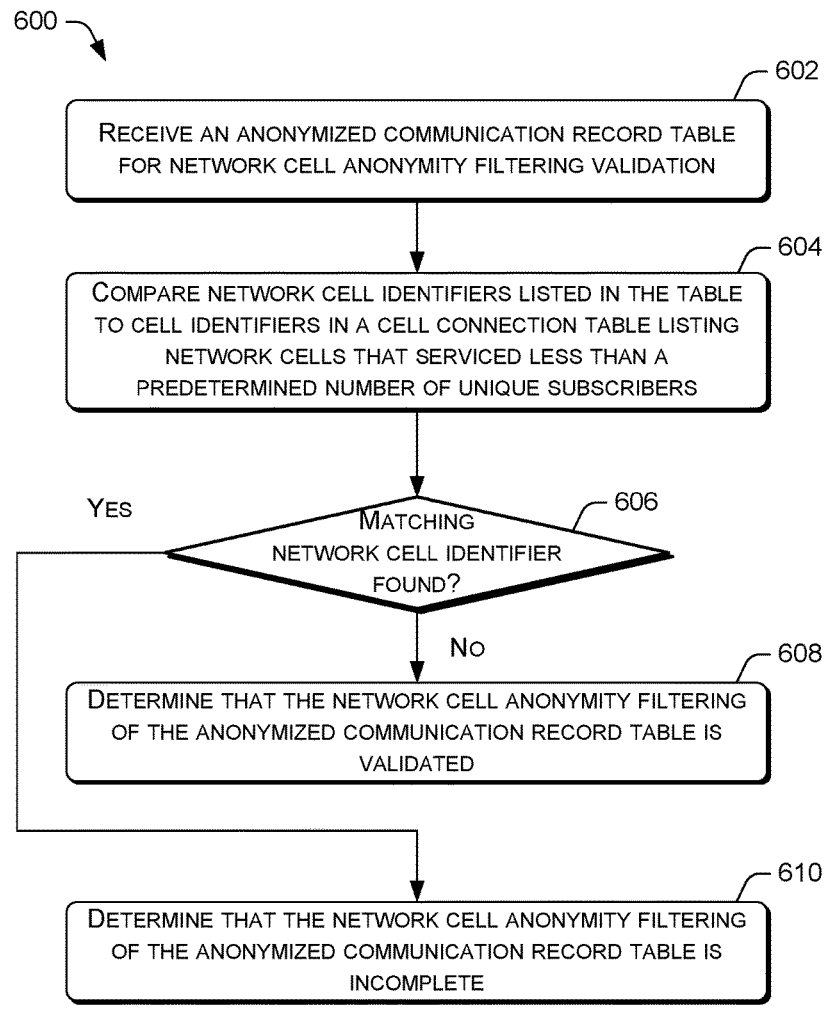
FIG. 6 is a flow diagram of an example process for performing network cell anonymity filtering validation on an anonymized communication record table.

FIG. 6 is a flow diagram of an example process 600 for performing network cell anonymity filtering validation on an anonymized communication record table. The example process 600 further describes block 406 of the example process 400. At block 602, the anonymity validation module 220 of the data export engine 102 may receive the anonymized communication record table 128 for opt-out filtering validation. The anonymized communication record table 128 may be generated by the anonymization module 216 of the data export engine 102 from the communication record table 124.

At block 604, the anonymity validation module 220 may compare network cell identifiers listed in the anonymized communication record table 128 to cell identifiers in a cell connection table 230 listing network cells that services less than a predetermined number of subscribers. The geographical region and the time period covered by the cell connection table 230 coincides with the geographical region and the time period covered by the anonymized communication record table 128.

At decision block 606, the anonymity validation module 220 may determine whether at least one matching network cell identifier is found between the cell connection table 230 and the anonymized communication record table 128. Accordingly, if the comparison return no matching network cell identifiers are no found ("no" at decision block 606), the process 600 may proceed to block 608. At block 608, the anonymity validation module 220 may determine that the network cell anonymity filtering of the anonymized communication record table is validated.

However, if the comparison does return one or more matching network cell identifiers between the anonymized communication record table 128 and the opt-out list 228 ("yes" at decision block 606), the process 600 may proceed to block 610. At block 610, the anonymity validation module 220 may determine that the network cell anonymity filtering of the anonymized communication record table 128 is incomplete.

Figure 7:
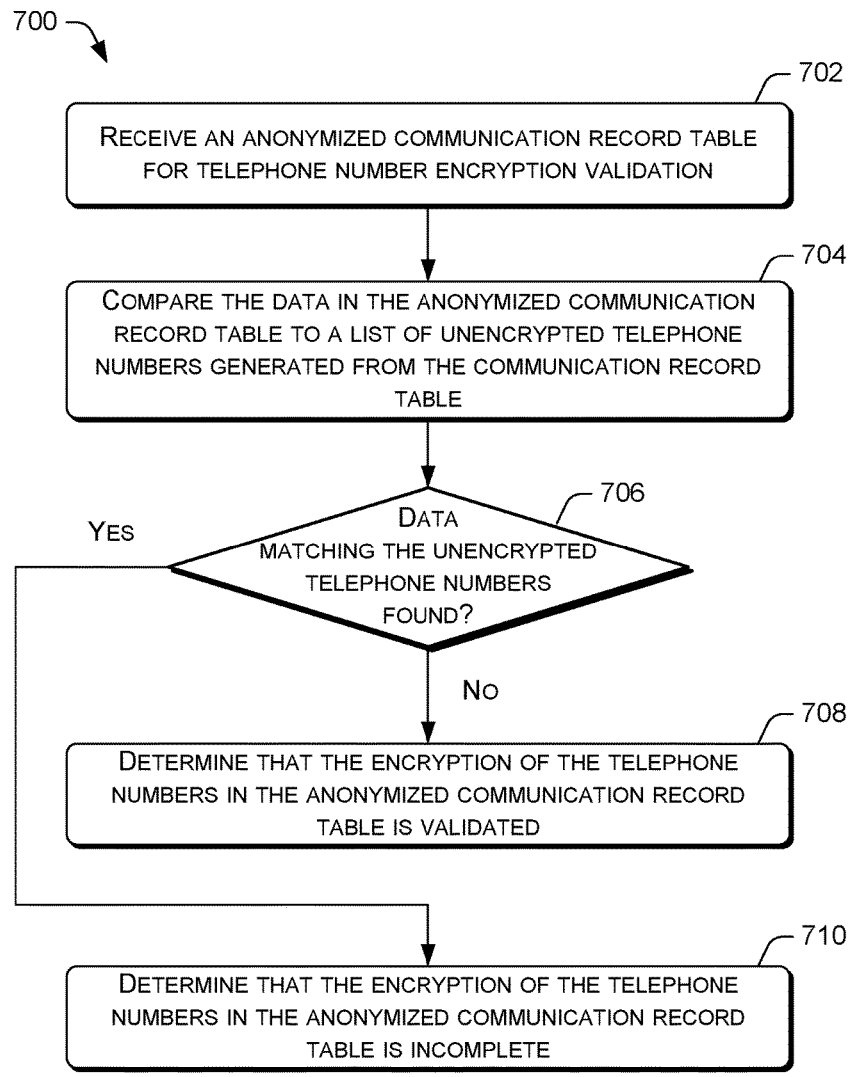
FIG. 7 is a flow diagram of an example process for performing telephone number encryption validation on an anonymized communication record table.

FIG. 7 is a flow diagram of an example process 700 for performing telephone number encryption validation on an anonymized communication record table. The example process 700 further describes block 410 of the example process 400. At block 702, the encryption validation module 222 of the data export engine 102 may receive the anonymized communication record table 128 for opt-out filtering validation. The anonymized communication record table 128 may be generated by the anonymization module 216 of the data export engine 102 from the communication record table 124.

At block 704, the encryption validation module 222 may compare the data in the anonymized communication record table 128 to a list of unencrypted telephone numbers, i.e., unencrypted list 232, that is generated from the communication record table 124. For example, the comparison may be performed by joining the unencrypted list 232 to the anonymized communication record table 128 to determine whether there are value matches.

At decision block 706, the encryption validation module 222 may determine whether data matching the unencrypted telephone numbers in the unencrypted list 232 is found in the anonymized communication record table 128. If the comparison does not return a match ("no" at decision block 706), the process 700 may proceed to block 708. At block 708, the encryption validation module 222 may determine that the encryption of the telephone numbers in the anonymized communication record table 128 is validated.

However, if the comparison does return data matching the unencrypted telephone numbers in the unencrypted list 232 from the anonymized communication record table 128 ("yes" at decision block 706), the process 700 may proceed to block 710. At block 610, the encryption validation module 222 may determine that the telephone number encryption of the anonymized communication record table 128 is incomplete.

The implementation of anonymization validation ensures that all personally identifiable information of subscribers are removed from the aggregated subscriber communication records that are shared by a mobile telecommunication carrier with a third-party servicer. In this way, the privacy of the subscribers are protected while third-party servicers are allowed to analyze the data to provide services that may be of value to the subscribers and the public at large. Such anonymization validation may further reduce or eliminate the time and computing resources associated with transmitting and storing communication record tables that do not meet privacy requirements. The unnecessary recall and/or deletion of a stored communication record table from a data store due to a few isolated anonymization errors may also be reduced or eliminated.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving wireless telecommunication network data of a wireless telecommunication network from multiple data sources;
   performing at least one of data aggregation or data filtering on the wireless telecommunication network data from the multiple data sources to generate an original communication record table;
   generating an anonymized communication record table from the original communication record table by filtering out or encrypting data pertaining to one or more subscribers, the anonymized communication record table including data pertaining to at least one of telephone calls, messages, and data connectivity sessions that are initiated or received by a plurality of subscribers of a wireless telecommunication network; and
   performing anonymization validation on the anonymized communication record table, the anonymization validation includes performing a validation of opt-out filtering to verify that the anonymized communication record table is free from corresponding communication record data belonging to one or more subscribers that have opted out of sharing the corresponding communication record data with a third-party servicer.

2. The one or more non-transitory computer-readable media of claim 1, wherein the anonymization validation further includes performing a validation of network cell anonymity filtering to ensure that when a network cell failed to service a predetermined number of unique subscribers during a time period, corresponding communication record data of at least one subscriber pertaining to telecommunication services that the at least one subscriber received from the network cell during the time period are purged from the anonymized communication record table.

3. The one or more non-transitory computer-readable media of claim 2, wherein the anonymization validation further includes performing a validation of telephone number encryption to confirm that all telephone numbers contained in the anonymized communication record table are encrypted such that no telephone numbers of any subscribers are revealed to the third-party servicer.

4. The one or more non-transitory computer-readable media of claim 3, wherein the acts further comprise:
   determining that the anonymized communication record table is a validated communication record table in response to validation that the opt-out filtering, the network cell anonymity filtering, and the telephone number encryption are properly performed; and
   sending the validated communication record table to a computing device of the third-party servicer.

5. The one or more non-transitory computer-readable media of claim 3, wherein the acts further comprise generating an alert that includes a request for error troubleshooting in response to validation failure of at least one of the opt-out filtering, the network cell anonymity filtering, or the telephone number encryption as performed for the anonymized communication record table.

6. The one or more non-transitory computer-readable media of claim 1, wherein the opt-out filtering comprises:
   generating an opt-out list from subscriber opt-out submissions that are received via at least one of a web portal associated with the wireless telecommunication network or user device applications on user devices that use telecommunication services provided by the wireless telecommunication network; and
   removing the corresponding communication record data belonging to one or more subscribers that have opted out of sharing the corresponding communication record data with the third-party servicer from the original communication record table based on the opt-out list.

7. The one or more non-transitory computer-readable media of claim 6, wherein the validation of the opt-out filtering comprises:
   comparing one or more subscriber identifiers listed in the anonymized communication record table to at least one subscriber identifier in the opt-out list;
   determining that the opt-out filtering of the anonymized communication record table is validated in response to a lack of any matching subscriber identifier between the anonymized communication record table and the opt-out list; and
   determining that the opt-out filtering of the anonymized communication record table is incomplete in response to at least one matching subscriber identifier between the anonymized communication record table and the opt-out list.

8. The one or more non-transitory computer-readable media of claim 2, wherein the network cell anonymity filtering comprises purging corresponding communication record data of at least one subscriber pertaining to telecommunication services that the at least one subscriber received from one or more network cells in a geographical region during the time period from the original communication record table in response to determining that each of the one or more network cells failed to service the predetermined number of unique subscribers during the time period.

9. The one or more non-transitory computer-readable media of claim 8, wherein the validation of the network cell anonymity filtering comprises:
   comparing network cell identifiers listed in the anonymized communication record table to cell identifiers in a cell connection table, the cell connection table listing network cells in the geographical region that serviced less than a predetermined number of unique subscribers in the time period;
   determining that the network cell anonymity filtering of the anonymized communication record table is validated in response to a lack of any matching network cell identifier between the anonymized communication record table and the cell connection table; and
   determining that the network cell anonymity filtering of the anonymized communication record table is incomplete in response to at least one matching network cell identifier between the anonymized communication record table and the cell connection table.

10. The one or more non-transitory computer-readable media of claim 3, wherein the telephone number encryption comprises encrypting every telephone number in the original communication record table using a one-way hash for generation of the anonymized communication record table.

11. The one or more non-transitory computer-readable media of claim 10, wherein the validation of the telephone number encryption comprises:
    comparing the data in the anonymized communication record table to a list of unencrypted telephone numbers generated from the original communication record table;
    determining that the telephone number encryption for the anonymized communication record table is validated in response to a lack of any matching unencrypted telephone number between the anonymized communication record table and the list of unencrypted telephone numbers; and
    determining that the telephone number encryption for the anonymized communication record table is incomplete in response to at least one matching unencrypted telephone number between the anonymized communication record table and the list of unencrypted telephone numbers.

12. A computer-implemented method, comprising:
    receiving, at the one or more computing devices, wireless telecommunication network data of a wireless telecommunication network from multiple data sources;
    performing, at the one or more computing devices, at least one of data aggregation or data filtering on the wireless telecommunication network data from the multiple data sources to generate an original communication record table;
    generating, at one or more computing devices, an anonymized communication record table from the original communication record table by filtering out or encrypting data pertaining to one or more subscribers, the anonymized communication record table including data pertaining to at least one of telephone calls, messages, and data connectivity sessions that are initiated or received by a plurality of subscribers of a wireless telecommunication network; and
    performing, at the one or more computing devices, anonymization validation on the anonymized communication record table, the anonymization validation including at least one of:
       performing a validation of opt-out filtering to verify that the anonymized communication record table is free from corresponding communication record data belonging to one or more subscribers that have opted out of sharing the corresponding communication record data with a third-party servicer;
       performing a validation of network cell anonymity filtering to ensure that when a network cell failed to service a predetermined number of unique subscribers during a time period, corresponding communication record data of at least one subscriber pertaining to telecommunication services that the at least one subscriber received from the network cell during the time period are purged from the anonymized communication record table; and
       performing a validation of telephone number encryption to confirm that all telephone numbers contained in the anonymized communication record table are encrypted such that no telephone numbers of any subscribers are revealed to the third-party servicer.

13. The computer-implemented method of claim 12, further comprising:
    determining, at the one or more computing devices, that the anonymized communication record table is a validated communication record table in response to validation that the opt-out filtering, the network cell anonymity filtering, and the telephone number encryption are properly performed; and
    sending, from the one or more computing devices, the validated communication record table to a computing device of the third-party servicer.

14. The computer-implemented method of claim 12, further comprising generating, at the one or more computing devices, an alert that includes a request for error troubleshooting in response to validation failure of at least one of the opt-out filtering, the network cell anonymity filtering, or the telephone number encryption as performed for the anonymized communication record table.

15. A system, comprising:
    one or more processors; and
    memory including a plurality of computer-executable components that are executable by the one or more processors to perform a plurality of actions, the plurality of actions comprising:
       receiving wireless telecommunication network data of a wireless telecommunication network from multiple data sources; and
       performing at least one of data aggregation or data filtering on the wireless telecommunication network data from the multiple data sources to generate an original communication record table, the original communication record table including data pertaining to at least one of telephone calls, messages, and data connectivity sessions that are initiated or received by a plurality of subscribers of the wireless telecommunication network;
       generating an anonymized communication record table from the original communication record table via filtering out or encryption of the data pertaining to one or more subscribers; and performing anonymization validation on the anonymized communication record table, the anonymization validation includes performing a validation of opt-out filtering to verify that the anonymized communication record table is free from corresponding communication record data belonging to one or more subscribers who have opted out of sharing the corresponding communication record data with a third-party servicer.

16. The system of claim 15, wherein the anonymization validation further includes performing a validation of network cell anonymity filtering to ensure that when a network cell failed to service a predetermined number of unique subscribers during a time period, corresponding communication record data of at least one subscriber pertaining to telecommunication services that the at least one subscriber received from the network cell during the time period are purged from the anonymized communication record table.

17. The system of claim 16, wherein the anonymization validation further includes performing a validation of telephone number encryption to confirm that all telephone numbers contained in the anonymized communication record table are encrypted such that no telephone numbers of any subscribers are revealed to the third-party servicer.

18. The system of claim 17, wherein the actions further comprise:

determining that the anonymized communication record table is a validated communication record table in response to validation that the opt-out filtering, the network cell anonymity filtering, and the telephone number encryption are properly performed; and sending the validated communication record table to a computing device of the third-party servicer.

19. The system of claim 15, wherein the actions further comprise generating an alert that includes a request for error troubleshooting in response to validation failure of the opt-out filtering performed for the anonymized communication record table.

20. The system of claim 15, wherein the opt-out filtering comprises:

generating an opt-out list from subscriber opt-out submissions that are received via at least one of a web portal associated with the wireless telecommunication network or user device applications on user devices that use telecommunication services provided by the wireless telecommunication network; and removing the corresponding communication record data belonging to one or more subscribers that have opted out of sharing the corresponding communication record data with the third-party servicer from the original communication record table based on the opt-out list.

* * * * *